(12) United States Patent
Bao et al.

(10) Patent No.: US 10,613,408 B2
(45) Date of Patent: Apr. 7, 2020

(54) LUMINOUS DISPLAY SUBSTRATE, DISPLAY PANEL AND METHOD OF CONTROLLING THE SAME, AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Huaxu Bao, Beijing (CN); Minghui Zhang, Beijing (CN); Bing Bai, Beijing (CN); Yubo Wang, Beijing (CN); Xiaohu Li, Beijing (CN); Inho Park, Beijing (CN); Weitao Chen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/146,557

(22) Filed: Sep. 28, 2018

(65) Prior Publication Data
US 2019/0285963 A1 Sep. 19, 2019

(30) Foreign Application Priority Data
Mar. 13, 2018 (CN) .......................... 2018 1 0205741

(51) Int. Cl.
*G02F 1/21* (2006.01)
*G09F 9/30* (2006.01)
*G09G 3/20* (2006.01)

(52) U.S. Cl.
CPC ................ *G02F 1/21* (2013.01); *G09F 9/301* (2013.01); *G09G 3/2003* (2013.01); *G09G 2310/0264* (2013.01); *G09G 2320/0626* (2013.01)

(58) Field of Classification Search
CPC ... G02F 1/21; G09F 9/301; G09G 2310/0264; G09G 2320/0626
See application file for complete search history.

(56) References Cited

U.S. PATENT DOCUMENTS

| 6,707,518 B1 * | 3/2004 | Cowan ............. G02F 1/133371 349/107 |
| 2003/0058491 A1 * | 3/2003 | Holmes ................ G03H 1/0252 359/2 |
| 2006/0285184 A1 * | 12/2006 | Phillips .................... B41M 3/14 359/2 |

(Continued)

OTHER PUBLICATIONS

"Radius of an arc or segment;" https://www.mathopenref.com/arcradius.html; Retrieved Sep. 28, 2019; pp. 1-2 (Year: 2019 ).*

*Primary Examiner* — Amare Mengistu
*Assistant Examiner* — Crystal Mathews
(74) *Attorney, Agent, or Firm* — Kinney & Lange, P.A.

(57) ABSTRACT

A luminous display substrate includes a base substrate, a light reflective and electrically conductive film layer on the base substrate, and a light-transmittance metal film layer on a side of the light reflective and electrically conductive film layer away from the base substrate. A side of the light reflective and electrically conductive film layer adjacent to the light-transmittance metal film layer is recessed towards the base substrate to form a curved surface.

16 Claims, 2 Drawing Sheets

(56) References Cited

U.S. PATENT DOCUMENTS

| | | | |
|---|---|---|---|
| 2010/0157408 A1* | 6/2010 | Chung | G02F 1/17 359/263 |
| 2011/0164308 A1* | 7/2011 | Arsenault | G02F 1/21 359/322 |
| 2016/0161646 A1* | 6/2016 | Tompkin | G02B 5/1842 359/571 |
| 2018/0016661 A1* | 1/2018 | Stevick | C22C 1/002 |
| 2018/0075625 A1* | 3/2018 | Li | H01L 33/34 |
| 2018/0336833 A1* | 11/2018 | Fan | G09G 3/34 |
| 2019/0086758 A1* | 3/2019 | Valentine | G02F 1/155 |
| 2019/0094644 A1* | 3/2019 | Zhang | G02F 1/21 |
| 2019/0107765 A1* | 4/2019 | Whitehead | G02F 1/01 |
| 2019/0228696 A1* | 7/2019 | Li | G09G 3/2003 |
| 2019/0256358 A1* | 8/2019 | Bao | C01B 32/194 |

* cited by examiner

LUMINOUS DISPLAY SUBSTRATE, DISPLAY PANEL AND METHOD OF CONTROLLING THE SAME, AND DISPLAY APPARATUS

CROSS-REFERENCE TO RELATED APPLICATION

This application claims priority to Chinese Patent Application No. 201810205741.1 filed on Mar. 13, 2018, in the State Intellectual Property Office of China, the disclosure of which is hereby incorporated by reference in its entirety.

TECHNICAL FIELD

The present disclosure relates to the field of display technology, and particularly, to a luminous display substrate, a display panel and a method of controlling the same, and a display apparatus.

BACKGROUND

At present, most of electronic paper books on the market are black-and-white screen electronic paper books using E-ink (Electronic Ink) technology. This kind of product has the characteristics of low energy consumption and simple display. Color display electronic paper books can also be realized by E-ink principle. However, in order to achieve full color display, it requires a color filter of complicated structure, which greatly reduces its image quality and brightness.

In the related art, most display devices use a backlight module as their light source to increase brightness. In a backlight module, generally, a light-emitting diode or a cold cathode fluorescent lamp tube is used as the light source. The light source is coupled to a display through a light guide plate. However, such light source has a large divergence angle, and the energy actually entering the light guide board is low, which results in a decrease of efficiency of the display device. In addition, the contrast is reduced due to crosstalk caused when the light enters the display.

SUMMARY

In accordance with one aspect of the present disclosure, there is provided a luminous display substrate that includes a base substrate, a light reflective and electrically conductive film layer on the base substrate, and a light-transmittance metal film layer on a side of the light reflective and electrically conductive film layer away from the base substrate. A side of the light reflective and electrically conductive film layer adjacent to the light-transmittance metal film layer is recessed towards the base substrate to form a curved surface.

In some embodiments, the light reflective and electrically conductive film layer comprises a graphene film layer.

In some embodiments, the graphene film layer comprises at least two graphene films laminated with one another.

In some embodiments, the curved surface has a curvature diameter ranged from about 10 micrometers to about 100 micrometers.

In some embodiments, a curvature of the curved surface is changeable based on a pulse voltage applied between the light reflective and electrically conductive film layer and the light-transmittance metal film layer.

In some embodiments, the light-transmittance metal film layer comprises a transparent metal film layer or a translucent metal film layer.

In some embodiments, the base substrate is made of silicon oxide material or flexible material.

In accordance with another aspect of the present disclosure, there is provided a display panel that includes the luminous display substrate of any one of the abovementioned embodiments and a drive circuit for generating a pulse voltage. The light reflective and electrically conductive film layer and the light-transmittance metal film layer of the luminous display substrate are electrically connected to a positive pole and a negative pole of the drive circuit, respectively.

In some embodiments, in the luminous display substrate, the light reflective and electrically conductive film layer comprises a graphene film layer.

In some embodiments, in the luminous display substrate, the graphene film layer comprises at least graphene films laminated with one another.

In some embodiments, in the luminous display substrate, the curved surface has a curvature diameter ranged from about 10 micrometers to about 100 micrometers.

In some embodiments, in the luminous display substrate, a curvature of the curved surface is changeable based on a pulse voltage applied between the light reflective and electrically conductive film layer and the light-transmittance metal film layer.

In some embodiments, in the luminous display substrate, the light-transmittance metal film layer comprises a transparent metal film layer or a translucent metal film layer, and the base substrate is made of silicon oxide material or flexible material.

In some embodiments, the display panel further includes a plurality of the luminous display substrates of any of the above embodiments, wherein, every three adjacent ones of the plurality of luminous display substrates constitute a pixel unit configured so that lights of different colors are reflected respectively from the three luminous display substrates of the pixel unit.

In accordance with yet another aspect of the present disclosure, there is provided a method of controlling the display panel of any one of the abovementioned embodiments, the method includes controlling, in response to a display instruction, the pulse voltage applied between the light reflective and electrically conductive film layer and the light-transmittance metal film layer, to control a color of a light emitted based on magnitude of the pulse voltage applied.

In some embodiments, the color of the light emitted is determined by a curvature of the curved surface, while the curvature of the curved surface is determined by an electrostatic adsorption force generated by the pulse voltage applied between the light reflective and electrically conductive film layer and the light-transmittance metal film layer.

In some embodiments, the display panel comprises a plurality of the luminous display substrates and the method includes addressing, by an addressing circuit, and controlling independently the plurality of luminous display substrates.

In some embodiments, the curved surface is machined by a micro electro mechanical system.

In some embodiments, when there is no pulse voltage applied, the luminous display substrate appears black color.

In accordance with still another aspect of the present disclosure, there is provided a display apparatus comprising the display panel of any one of the abovementioned embodiments.

BRIEF DESCRIPTION OF THE DRAWINGS

The above and/or additional aspects and advantages of the present disclosure will become apparent and readily understood from the description of the embodiments in conjunction with the accompanying drawings hereinafter, in which.

DETAILED DESCRIPTION OF THE EMBODIMENTS

Figure 1:
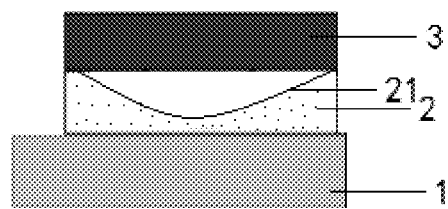
FIG. 1 is a schematic view showing a structure of a luminous display substrate according to an embodiment of the present disclosure.

These embodiments of the present disclosure will be described in detail below, and the examples of the embodiments are illustrated in the accompanying drawings, wherein the same or similar reference numerals are always used to refer to elements having the same or similar structures or elements having the same or similar functions. The embodiments described below with reference to the accompanying drawings are illustrative, are intended to explain the present disclosure, and are not to be construed as limiting the present disclosure.

In the field of display technology, a display, for example, a Thin Film Transistor-Liquid Crystal Display (TFT-LCD), generally includes an array substrate, a liquid crystal layer, and a color film substrate. Chrominance and luminance of the light emitted is determined generally by the color film substrate.

Graphene film is a planar film composed of carbon atoms presented in hexagonal honeycomb crystal lattice of sp2 hybrid orbital, and the thickness of the graphene film is only a thickness of one carbon atom. Accordingly, optical property (e.g., light transmittance) and electrical properties (e.g., electrical conductivity) of the graphene film are extremely prominent.

Interferometric Modulation (IMOD) technology is a new reflective display technology that uses the principle of light interference in physics to emit light with a small amount of power. A basic unit for IMOD is a tiny structure in which two films define therebetween a gap that determines a color of light reflected when a light is irradiated on a display.

It is found by inventor(s) that thin film graphene film with good optical property, electrical property, and physical properties can be introduced into the field of display technology in combination with IMOD technology. By adjusting its light reflection curvature, the graphene film can reflect light of different wavelengths based on different curvatures, thereby determining chrominance and luminance of the light emitted.

Figure 2:
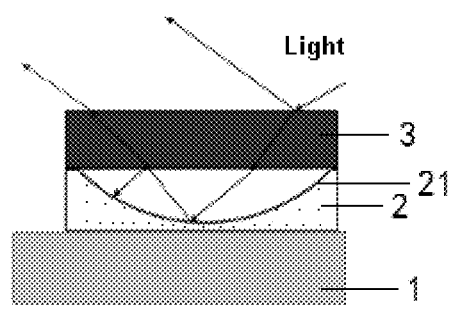
FIG. 2 is a schematic view showing a propagation path of a light in the luminous display substrate according to the embodiment of the present disclosure.

The present disclosure provides a luminous display substrate in FIG. 1 with FIG. 1 being a schematic view of a structure of a luminous display substrate. The luminous display substrate comprises a base substrate 1, a light reflective and electrically conductive film layer 2 on the base substrate 1, and a light-transmittance metal film layer 3 on a side of the light reflective and electrically conductive film layer 2 opposite/away from the base substrate 1. A side surface of the light reflective and electrically conductive film layer 2 closing to the light-transmittance metal film layer 3 is recessed towards the base substrate 1 to form a curved surface 21. It should be noted that, in the present disclosure, the term "light reflective and electrically conductive film layer" indicates a film layer having both the light reflective property and the electrically conductive property (according to the embodiments of the present disclosure, this film layer may be a graphene film) and the term "light-transmittance metal film layer" indicates a film layer having light transmission property or transmission property and also having electrically conductive property. There is a gap between the light reflective and electrically conductive film layer 2 and the light-transmittance metal film layer 3, and the propagation path of a light is shown by a broken line with an arrow in FIG. 2. External natural light passes through the light-transmittance metal film layer 3, enters the gap between the light reflective and electrically conductive film layer 2 and the light-transmittance metal film layer 3, and is repeatedly reflected between the light reflective and electrically conductive film layer 2 and the light-transmittance metal film layer 3. Since lights of different wavelengths have different reflection trajectories and, due to different thicknesses of the gap between the light-transmittance metal film layer 3 and portions of the curved surface 21, they meet to generate interference at an upper surface of the light-transmittance metal film layer 3, light of specific wavelength is emitted from the light-transmittance metal film layer 3 so that a specific color is exhibited, thereby realizing the emission of a visible light without provision of a backlight source and achieving color display of the display device, i.e., the luminous display substrate.

According to embodiments of the present disclosure, manufacturing material for the base substrate 1 comprises silicon oxide material or suitable flexible material. Common glass substrate, for example silicon oxide material, can be selected as the base substrate 1. As manufacturing material for the base substrate 1, silicon oxide material has high hardness and can prevent the layers on the base substrate 1 from being contaminated and damaged by external environment, thereby providing a good protection effect. In addition, the silicon oxide material is low in cost and thus can reduce the cost of the display device. The base substrate 1 can also be made of a flexible material such as plastic or ceramic. A flexible base substrate 1 can enhance bending performance of the display device and improve the user experience.

According to embodiments of the present disclosure, the light reflective and electrically conductive film layer 2 on the base substrate 1 is a graphene film layer. The graphene film layer comprises at least graphene films laminated with one another. A single-layer graphene film is a planar film composed of carbon atoms presented in hexagonal honeycomb crystal lattice of sp2 hybrid orbital, and the single-layer graphene film has a light absorption rate of only about 2.3% and thus owns a good light transmittance. The electron conduction velocity in the graphene film is about 1/300 of the speed of light, and the thickness of the graphene film is only a thickness of one carbon atom. Accordingly, optical and electrical properties of the graphene film are extremely prominent. In order to obtain improved reflective characteristics of the light reflective and electrically conductive film layer, the graphene film layer includes at least graphene films laminated with one another, such as two graphene films or four graphene films laminated with one another. In an embodiment of the present disclosure, the graphene film layer is a three-dimensional structure composed of two graphene films laminated with one another (shown in FIG.

1). The first graphene film is on the base substrate 1 and is in a direct contact with the base substrate 1. The second graphene film is on the first graphene film with a surface of the second graphene film being the curved surface having a center of curvature that is close to the light-transmittance metal film layer 3. The curved structure of the second graphene film causes the gap between the second graphene film and the light-transmittance metal film layer 3.

According to a relationship between a curvature radius of the curved surface and a wavelength of the light emitted, it is calculated that, when the emitted light includes red light, green light, and blue light, a curvature diameter of the curved surface is ranged from about 10 micrometers to about 100 micrometer. That is, if the curvature diameter of the curved surface is within this range, the light emitted is visible light including red light, green light, and blue light. The ranges of curvature diameter corresponding to monochromatic red light, monochromatic green light, monochromatic blue light emitted can be determined by calculation or experimental data. By keeping a curvature diameter of the curved surface within the range of curvature diameter corresponding to any one of the monochromatic red light, the monochromatic green light, the monochromatic blue light, or by switching the curvature diameter of the curved surface between the ranges of curvature diameter respectively corresponding to the monochromatic red light, the monochromatic green light, and/or the monochromatic blue light, the light emitted from the luminous display substrate can be any one of the monochromatic red light, the monochromatic green light, and/or the monochromatic blue light. Three adjacent luminous display substrates can be combined into one pixel unit. When displayed, the monochromatic lights emitted from the three luminous display substrates in the pixel unit are controlled in proportion to blend into various colors that can be recognized by the eye, thereby achieving a full color display of the display device.

According to embodiments of the present disclosure, the light-transmittance metal film layer 3 on a side of the light reflective and electrically conductive film layer 2 away from the base substrate 1 is a transparent metal film layer or a translucent metal film layer. Since no backlight source is provided in the solution according to embodiments of the present disclosure and a natural light is used as light source, a light needs to enter and exit from the light-transmittance metal film layer 3. The light-transmittance metal film layer 3 is used as both light incident surface and light exit surface of the light. The light-transmittance metal film layer 3 uses a light-transmitting material, which facilitates entering and exit of the light, increasing light transmittance and reducing light loss.

Figure 3:
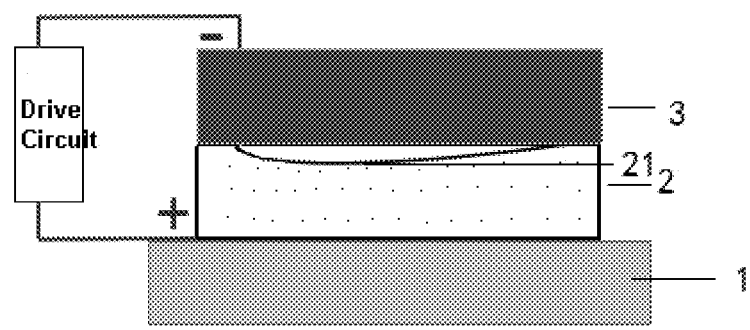
FIG. 3 is a schematic view showing a structural principle of a display panel according to an embodiment of the present disclosure.

Furthermore, the present disclosure also provides a display panel that includes the luminous display substrate according to any one of the above embodiments of the present disclosure, and a drive circuit for generating a pulse voltage. A structural principle of the display panel is shown in FIG. 3. The drive circuit includes an external power supply that provides a pulse voltage. The light reflective and electrically conductive film layer 2 of the luminous display substrate is electrically connected to a positive pole of the drive circuit, and the light-transmittance metal film layer 3 of the luminous display substrate is electrically connected to a negative pole of the drive circuit.

It is worth noting that the connections to the positive and negative poles of the driving circuit are interchangeable; that is, the light reflective and electrically conductive film layer 2 of the luminous display substrate can be electrically connected to the negative pole of the driving circuit, while the light-transmittance metal film layer 3 of the luminous display substrate is electrically connected to the positive pole of the driving circuit.

Figure 5:
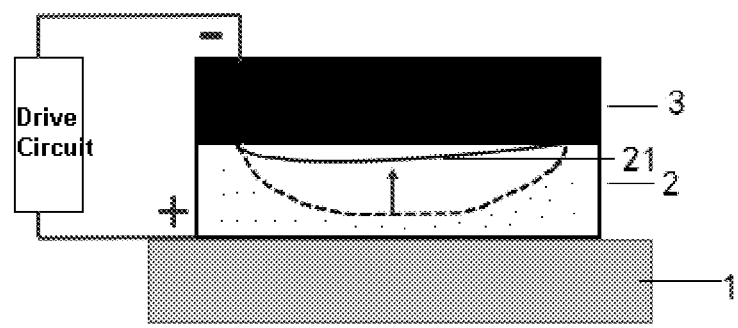
FIG. 5 is a schematic view showing a structural principle of color conversion of the display panel according to the embodiment of the present disclosure.

According to embodiments of the present disclosure, a recessed portion is firstly formed on a surface of one graphene film by using a Micro Electro Mechanical System (MEMS). Natural light enters the recessed portion of the graphene film after passing through the light-transmittance metal film layer 3. Light reflected between the upper and lower surfaces of the gap forms coherent light that then exits from the light-transmittance metal film layer 3. The driving circuit provided by the present disclosure can provide a pulse voltage to the luminous display substrate. Since the light reflective and electrically conductive film layer 2 has good electrical conductivity and especially the graphene film layer has excellent electrical characteristics, and the propagation velocity of electrons in the graphene film, about $\frac{1}{300}$ of the speed of light, is much greater than that in a metal, and the electrostatic adsorption force caused by the application of a pulse voltage between the graphene film and the metal film causes the recessed portion of the graphene film to shrink upward (as shown in FIG. 5, the curved surface 21 formed by the recessed portion is shrunk upward along a straight arrow direction from a dotted line to a solid line), thereby changing the curvature of the curved surface of the graphene film so that light of specific wavelength that was previously emitted cannot be emitted due to the change of the curvature of the curved surface but light of another specific wavelength can be emitted from the light-transmittance metal film layer 3 by interference. That is, the wavelength of the light emitted is changed, and thus the color of the light emitted is changed, which results in changing of the color of the light emitted. As the pulse voltage increases, the electrostatic adsorption force caused by the pulse voltage causes the recessed portion of this film to continue to shrink upward so the radius of curvature increases and the curvature decreases. According to the relationship between the curvature diameter of the curved surface 21 and the wavelength of the light, if the experimental conditions are the same, the larger the radius of curvature of the curved surface 21 is, the smaller the wavelength of the light emitted is and the smaller the curvature of the curved surface 21 is.

Figure 4:
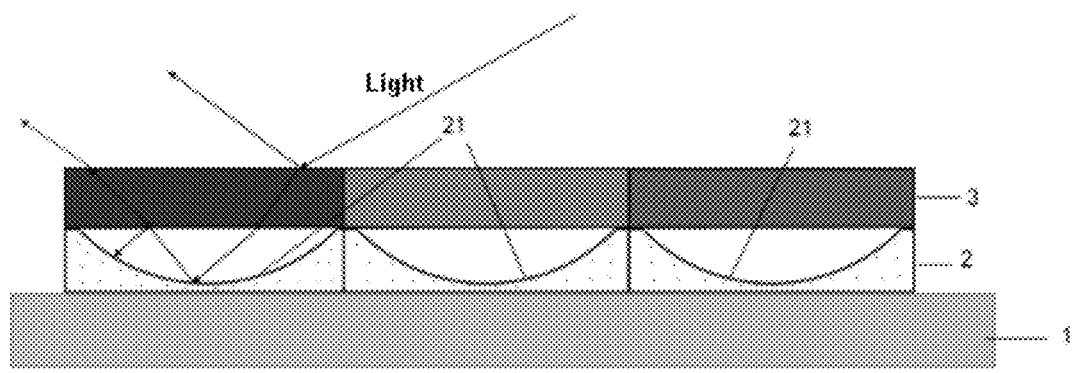
FIG. 4 is a schematic view showing a structure of the display panel according to the embodiment of the present disclosure.

According to embodiments of the present disclosure, the display panel comprises a plurality of the luminous display substrates, and every three adjacent ones of the luminous display substrates constitute a pixel unit configured so that monochromatic lights of different colors are emitted respectively from the three luminous display substrates of the pixel unit. A schematic structure of the display panel is shown in FIG. 4. In the embodiment shown in FIG. 4, three adjacent luminous display substrates constitute a pixel unit, and each luminous display substrate serves as a sub-pixel unit. Lights emitted from the three luminous display substrates in one pixel unit are respectively red light, green light, and blue light. Positional relationship between the three luminous display substrates is not limited herein and can be adjusted according to actual requirements, for example, the positional relationship can be any one of red-green-blue, green-red-blue, and red-blue-green. Magnitude of the pulse voltage generated by the drive circuit is adjusted to fall into the ranges of emitting red light, green light, and blue light so that the color of the light emitted from each of the luminous display substrates can be any one of a red color, green color, and blue color. In accordance with the principle of three primary colors, by blending the three primary colors in different proportions, other visible light can be displayed by the display device, thereby achieving full color display of the display device and improving user experience.

Correspondingly, the present disclosure further provides a method of controlling the display panel. The method includes controlling, in response to a display instruction, the pulse voltage applied between the light reflective and electrically conductive film layer 2 and the light-transmittance metal film layer 3 to control a color of a light emitted based on magnitude of the pulse voltage applied.

The color of the light emitted is determined by the curvature of the curved surface 21, and the curvature of the curved surface 21 is determined by the electrostatic adsorption force generated by the pulse voltage applied between the light reflective and electrically conductive film layer 2 and the light-transmittance metal film layer 3.

FIG. 5 shows a structural principle of color conversion of the display panel by controlling magnitude of the pulse voltage applied. A display instruction is received and analyzed. The display instruction includes analyzing, by a processor, an image to be displayed by a display panel and determining display parameters, including display color and display brightness required, of the luminous display substrates. The processor transmits the display instruction including the display parameters to the luminous display substrate. In accordance with the display parameters, the luminous display substrate determines and adjusts magnitude of the pulse voltage applied between the light reflective and electrically conductive film layer 2 and the light-transmittance metal film layer 3. The ranges of pulse voltage respectively corresponding to red light, green light, and blue light emitted are determined by calculation or experimental data. By keeping the pulse voltages within the ranges of pulse voltage respectively corresponding to red light, green light, and blue light; or by switching the pulse voltages between the ranges of pulse voltage respectively corresponding to the red light, the green light, and the blue light; an electrostatic adsorption force generated by the pulse voltage changes with the pulse voltage. The increase or decrease of the pulse voltage causes the recessed portion of the graphene film to shrink upward or expand downward, so that the gap between the graphene film and the light-transmittance metal film layer 3 becomes smaller or bigger correspondingly. Accordingly, the curvature of the curved surface 21 between the light reflective and electrically conductive film layer 2 and the light-transmittance metal film layer 3 is changed. Change of the curvature of each luminous display substrate causes the wavelength of the light emitted from corresponding sub-pixel unit to change, thereby changing the color of the light emitted from each luminous display substrate. A side surface of the light reflective and electrically conductive film layer 2 closest/adjacent to the light-transmittance metal film layer 3 is recessed towards the base substrate 1 to form the curved surface 21, and the curvature of the curved surface 21 is determined by the electrostatic adsorption force generated by the pulse voltage applied between the light reflective and electrically conductive film layer 2 and the light-transmittance metal film layer 3. Accordingly, the greater the electrostatic adsorption force generated by the pulse voltage applied between the light reflective and electrically conductive film layer 2 and the light-transmittance metal film layer 3 is, the closer the curved surface is to the light-transmittance metal film layer 3 and the greater the radius of curvature of the curved surface 21 is (that is, the smaller the curvature of the curved surface 21 is). Conversely, the smaller the electrostatic adsorption force generated by the pulse voltage applied between the light reflective and electrically conductive film layer 2 and the light-transmittance metal film layer 3 is, the bigger the gap between the curved surface 21 and the light-transmittance metal film layer 3 is and the smaller the radius of curvature of the curved surface 21 is (that is, the greater the curvature of the curved surface 21 is).

A side surface of the light reflective and electrically conductive film layer 2 closest/adjacent to the light-transmittance metal film layer 3 is recessed towards the base substrate 1 to form the curved surface 21, and the curvature of the curved surface 21 determines the color of the light emitted. Since lights of different wavelengths have different reflection trajectories, change of the curvature of the curved surface 21 causes the reflection trajectory to change, so that light of specific wavelength is emitted and a specific color for the light of specific wavelength is exhibited, thus achieving change of the color.

Different curvatures of the curved surface 21 cause different color of the light emitted. In order to achieve a full color display, the pulse voltage applied between the light reflective and electrically conductive film layer 2 and the light-transmittance metal film layer 3 is controlled so that the light emitted from the luminous display substrate is any one of a red light, a blue light, or a green light. The plurality of luminous display substrates are controlled independently to obtain different colors of the light emitted. One pixel unit comprises red, green, and blue sub-pixel units. An addressing circuit defined in horizontal and vertical directions is used to address each sub-pixel unit, which is an independently drivable addressable unit. An ideal gray scale can be obtained by separately controlling the sub-pixel units. When the thickness of the gap between the curved surface 21 of the light reflective and electrically conductive film layer 2 and the corresponding surface of the light-transmitting metal film layer 3 is reduced and an isolated state is formed, the visible light interference is weakened and the wavelength of the light reflected falls outside the visible wavelength range so that the sub-pixel appears black. As a result, the luminous display substrate stays in a switch off state of display, namely in a black state, similar to switch on-and-off of a liquid crystal pixel. In other word, when no pulse voltage is applied, the luminous display substrate of the display panel appears black. Before switching back to color display, the sub-pixel is kept in black without power consumption, which greatly saves electricity. In order to switch the black state to color display, it only needs to apply a pulse voltage again to adjust the electrostatic adsorption force and thus the wavelength of the light emitted.

A side surface of the light reflective and electrically conductive film layer 2 closest/adjacent to the light-transmittance metal film layer 2 is recessed towards the base substrate to form a curved surface 21. The curved surface 21 is formed by using Micro Electro Mechanical System (MEMS). Since the Micro Electro Mechanical System is driven by very little power, the display device can keep stability for a long period of time.

Furthermore, the present disclosure also provides a display apparatus comprising the display panel according to any one of the above embodiments of the present disclosure. This display apparatus is improved on the basis of the display panel mentioned in the foregoing embodiments, and has the same advantageous effects as the display panel mentioned in the foregoing embodiments.

It should be noted that the display apparatus provided by the present disclosure may be any product or component having a display function, such as an electronic paper, an OLED panel, a mobile phone, a tablet computer, a television, a display, a notebook computer, a digital photo frame, a navigator, and the like.

The luminous display substrate, the display panel, the method of controlling the display panel, and the display apparatus provided by the present disclosure achieve color display by utilizing reflection of light in the gap between the light reflective and electrically conductive film layer 2 and the light-transmittance metal film layer 3 and by generating colors by means of film interference caused by a thickness of the gap. The luminous display substrate achieves color display without provisions of backlight source and filter and has a short response time, low power consumption, high visible under strong light, and improves user experience.

While some exemplary embodiments of the present disclosure have been shown and described above, it is understood that the above embodiments are illustrative and are not to be construed as limiting the scope of the present disclosure. For those skilled in the art, changes and modifications can be made to these exemplary embodiments within the scope of the present disclosure, the scope of which is defined in the claims and their equivalents.

What is claimed is:

1. A luminous display substrate comprising:
    a base substrate;
    a light reflective and electrically conductive film layer adjacent the base substrate; and
    a light-transmittance metal film layer adjacent the light reflective and electrically conductive film layer opposite the base substrate,
    wherein a side of the light reflective and electrically conductive film layer adjacent to the light-transmittance metal film layer is recessed towards the base substrate to form a curved surface; and
    wherein the light reflective and electrically conductive film layer comprises a graphene film layer, and the graphene film layer comprises at least two graphene films laminated with one another.

2. The luminous display substrate of claim 1, wherein a curvature of the curved surface is changeable based on a pulse voltage applied between the light reflective and electrically conductive film layer and the light-transmittance metal film layer.

3. The luminous display substrate of claim 2, wherein the light-transmittance metal film layer is a transparent metal film layer or a translucent metal film layer.

4. The luminous display substrate of claim 3, wherein the base substrate is made of silicon oxide material or flexible material.

5. The luminous display substrate of claim 1, wherein the curved surface has a curvature diameter that ranges from about 10 micrometers to about 100 micrometers.

6. A display panel, comprising:
    the luminous display substrate of claim 1; and
    a drive circuit for generating a pulse voltage,
    wherein the light reflective and electrically conductive film layer and the light-transmittance metal film layer of the luminous display substrate are electrically connected to a positive pole and a negative pole of the drive circuit, respectively.

7. The display panel of claim 6, wherein, in the luminous display substrate, the curved surface has a curvature diameter that ranges from about 10 micrometers to about 100 micrometers.

8. The display panel of claim 6, wherein, in the luminous display substrate, a curvature of the curved surface is changeable based on a pulse voltage applied between the light reflective and electrically conductive film layer and the light-transmittance metal film layer.

9. The display panel of claim 8, wherein, in the luminous display substrate, the light-transmittance metal film layer is a transparent metal film layer or a translucent metal film layer, and the base substrate is made of silicon oxide material or flexible material.

10. The display panel of claim 9, further comprising:
    a plurality of the luminous display substrates of claim 1,
    wherein every three adjacent ones of the plurality of luminous display substrates constitute a pixel unit configured so that lights of different colors are reflected respectively from the three luminous display substrates of the pixel unit.

11. A method of controlling a display panel having a drive circuit for generating a pulse voltage and a luminous display substrate having a base substrate, a light reflective and electrically conductive film layer adjacent to the base substrate, and a light-transmittance metal film layer adjacent to the light reflective and electrically conductive film layer opposite the base substrate with the light reflective and electrically conductive film layer having a recess in a side adjacent the light-transmittance metal film layer that extends towards the base substrate to form a curved surface, wherein the light reflective and electrically conductive film layer comprises a graphene film layer, and the graphene film layer comprises at least two graphene films laminated with one another, the method comprising:
    controlling, in response to a display instruction, the pulse voltage applied between the light reflective and electrically conductive film layer and the light-transmittance metal film layer to control a color of a light emitted based on magnitude of the pulse voltage applied.

12. The method of claim 11, wherein the color of the light emitted is determined by a curvature of the curved surface and the curvature of the curved surface is determined by an electrostatic adsorption force generated by the pulse voltage applied between the light reflective and electrically conductive film layer and the light-transmittance metal film layer.

13. The method of claim 12, wherein the display panel inlcudes a plurality of the luminous display substrates and the method further comprises:
    addressing, by an addressing circuit, and controlling independently the plurality of luminous display substrates.

14. The method of claim 11, wherein the curved surface is machined by a micro electro-mechanical system.

15. The method of claim 11, wherein, when there is no pulse voltage applied, the luminous display substrate is a black color.

16. A display apparatus comprising:
    a drive circuit for generating a pulse voltage; and
    a luminous display substrate comprising:
        a base substrate;
        a light reflective and electrically conductive film layer adjacent the base substrate; and
        a light-transmittance metal film layer adjacent the light reflective and electrically conductive film layer opposite the base substrate,
        wherein a side of the light reflective and electrically conductive film layer adjacent to the light-transmittance metal film layer is recessed towards the base substrate to form a curved surface and the light reflective and electrically conductive film layer and the light-transmittance metal film layer are electrically connected to a positive pole and a negative pole of the drive circuit, respectively; and wherein the light reflective and electrically conductive film layer comprises a graphene film layer, and a graphene film layer comprises at least two graphene films laminated with one another.

\* \* \* \* \*